US011885261B2

(12) United States Patent
Ivankovic

(10) Patent No.: US 11,885,261 B2
(45) Date of Patent: Jan. 30, 2024

(54) ICE ACCUMULATION AND SHEDDING MITIGATION FOR SENSOR PROBE

(71) Applicant: PRATT & WHITNEY CANADA CORP., Longueuil (CA)

(72) Inventor: Milos Ivankovic, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 107 days.

(21) Appl. No.: 17/180,017

(22) Filed: Feb. 19, 2021

(65) Prior Publication Data

US 2022/0268210 A1  Aug. 25, 2022

(51) Int. Cl.
| | |
|---|---|
| *F02C 7/00* | (2006.01) |
| *B64D 15/12* | (2006.01) |
| *F02C 3/04* | (2006.01) |
| *F02C 6/20* | (2006.01) |
| *B64D 33/02* | (2006.01) |

(52) U.S. Cl.
CPC ............... *F02C 7/00* (2013.01); *B64D 15/12* (2013.01); *F02C 3/04* (2013.01); *F02C 6/20* (2013.01); *B64D 33/02* (2013.01); *B64D 2033/0233* (2013.01); *B64D 2033/0286* (2013.01); *F05D 2220/323* (2013.01); *F05D 2220/36* (2013.01); *F05D 2240/35* (2013.01)

(58) Field of Classification Search
CPC . F02C 7/04; F02C 7/047; B64D 15/12; B64D 2033/0233
See application file for complete search history.

(56) References Cited

U.S. PATENT DOCUMENTS

| | | | | |
|---|---|---|---|---|
| 7,845,222 | B1* | 12/2010 | Goedel | G01D 5/30 73/170.02 |
| 8,100,582 | B1* | 1/2012 | Powell | G01K 13/028 374/138 |
| 9,970,824 | B2* | 5/2018 | Cheung | G01K 13/028 |
| 10,545,057 | B2* | 1/2020 | Parsons | G01K 1/20 |
| 2014/0064330 | A1* | 3/2014 | Agami | G01K 13/028 374/138 |
| 2015/0093244 | A1* | 4/2015 | Wigen | G01K 13/028 416/61 |
| 2016/0032757 | A1* | 2/2016 | Liu | G01K 13/028 416/61 |
| 2018/0372557 | A1* | 12/2018 | Shaughnessy | G01K 13/028 |

* cited by examiner

*Primary Examiner* — Thuyhang N Nguyen
(74) *Attorney, Agent, or Firm* — Norton Rose Fulbright Canada LLP

(57) ABSTRACT

Ice accumulation and shedding mitigation devices associated with sensor probes extending into a stream of air entering an aircraft engine are provided. An exemplary device comprises a wedge-shaped blade configured to be exposed to the stream of air and disposed upstream of the sensor probe. The wedge-shaped blade has two faces meeting at a leading edge oriented to face the stream of air.

12 Claims, 10 Drawing Sheets

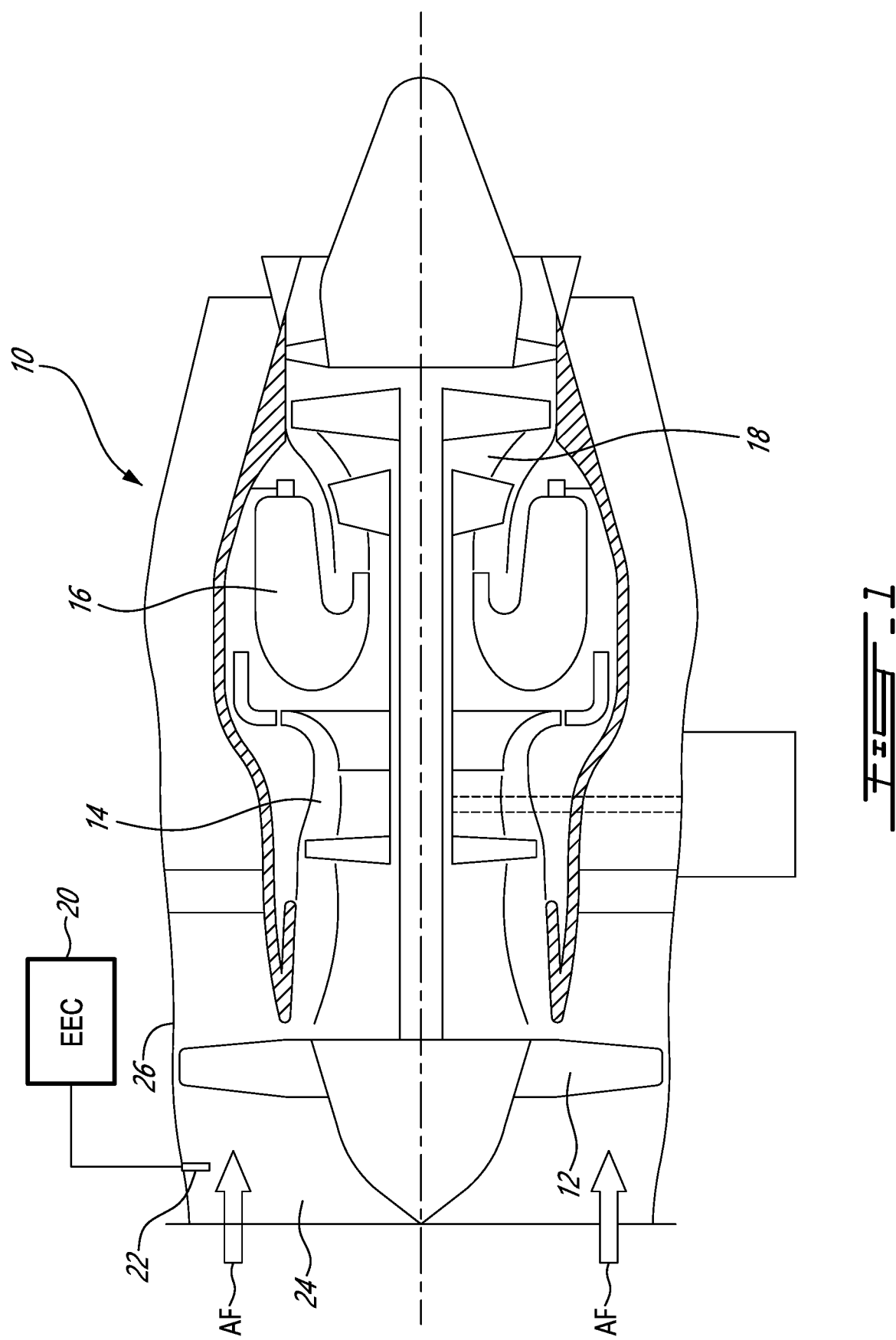

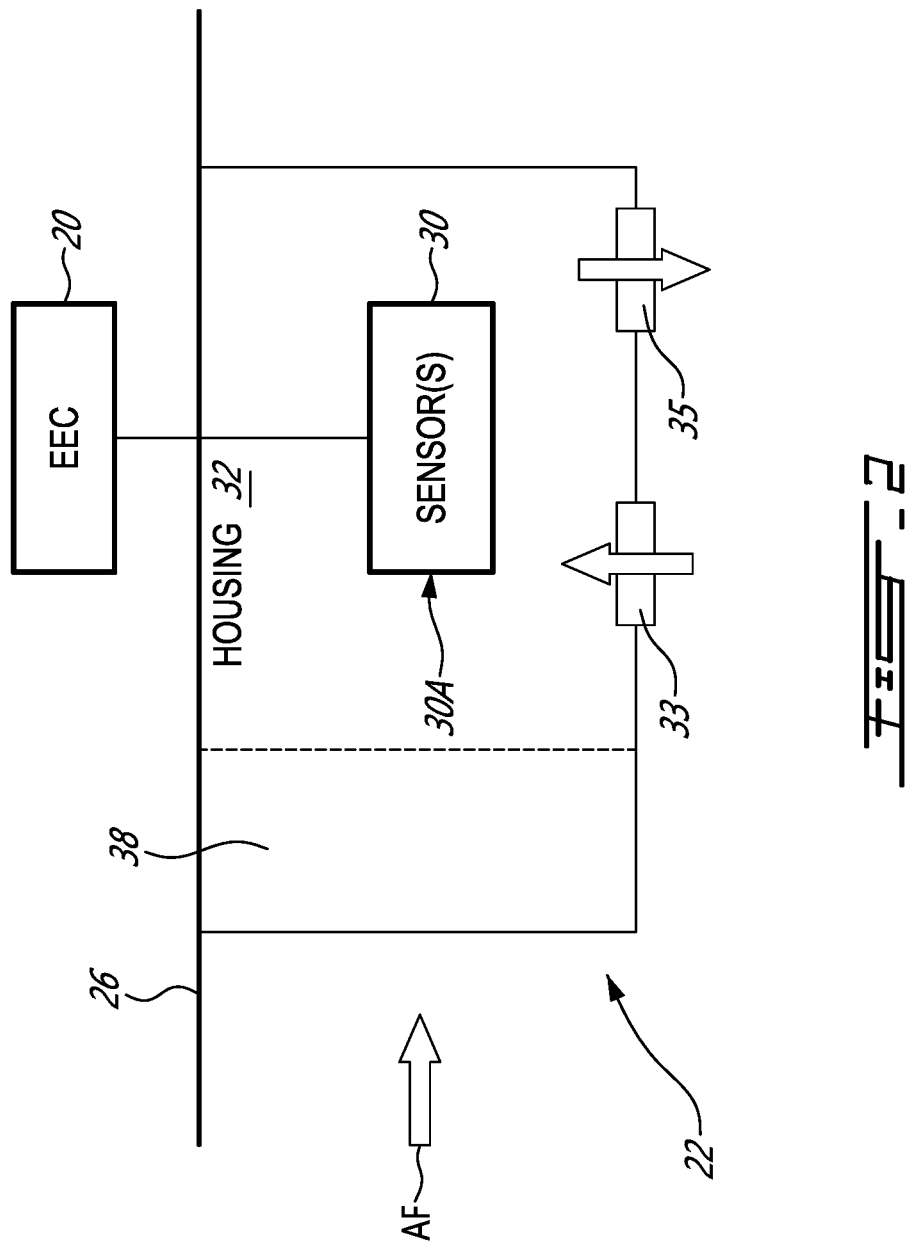

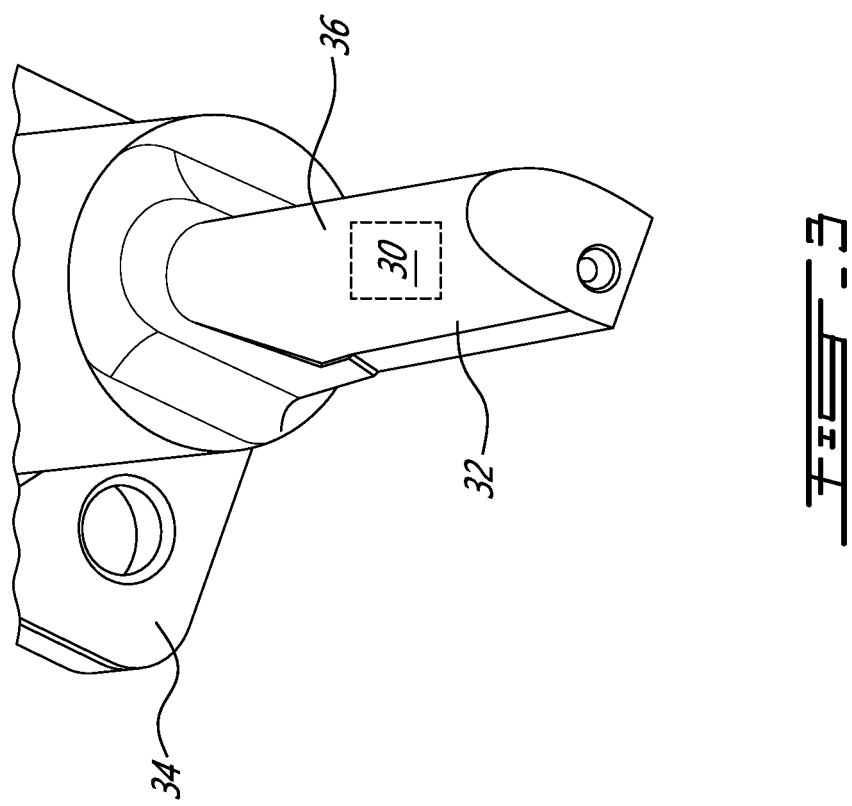

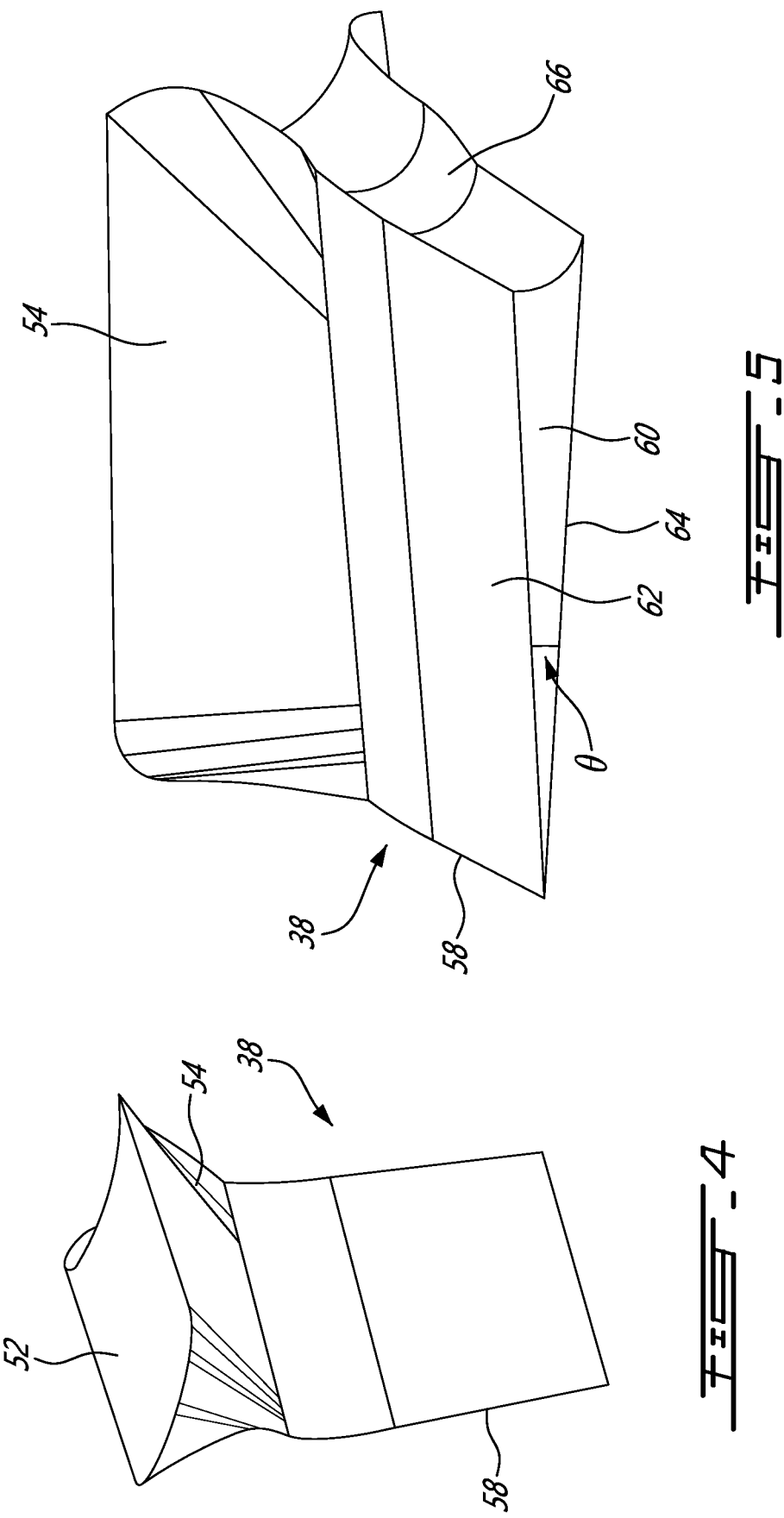

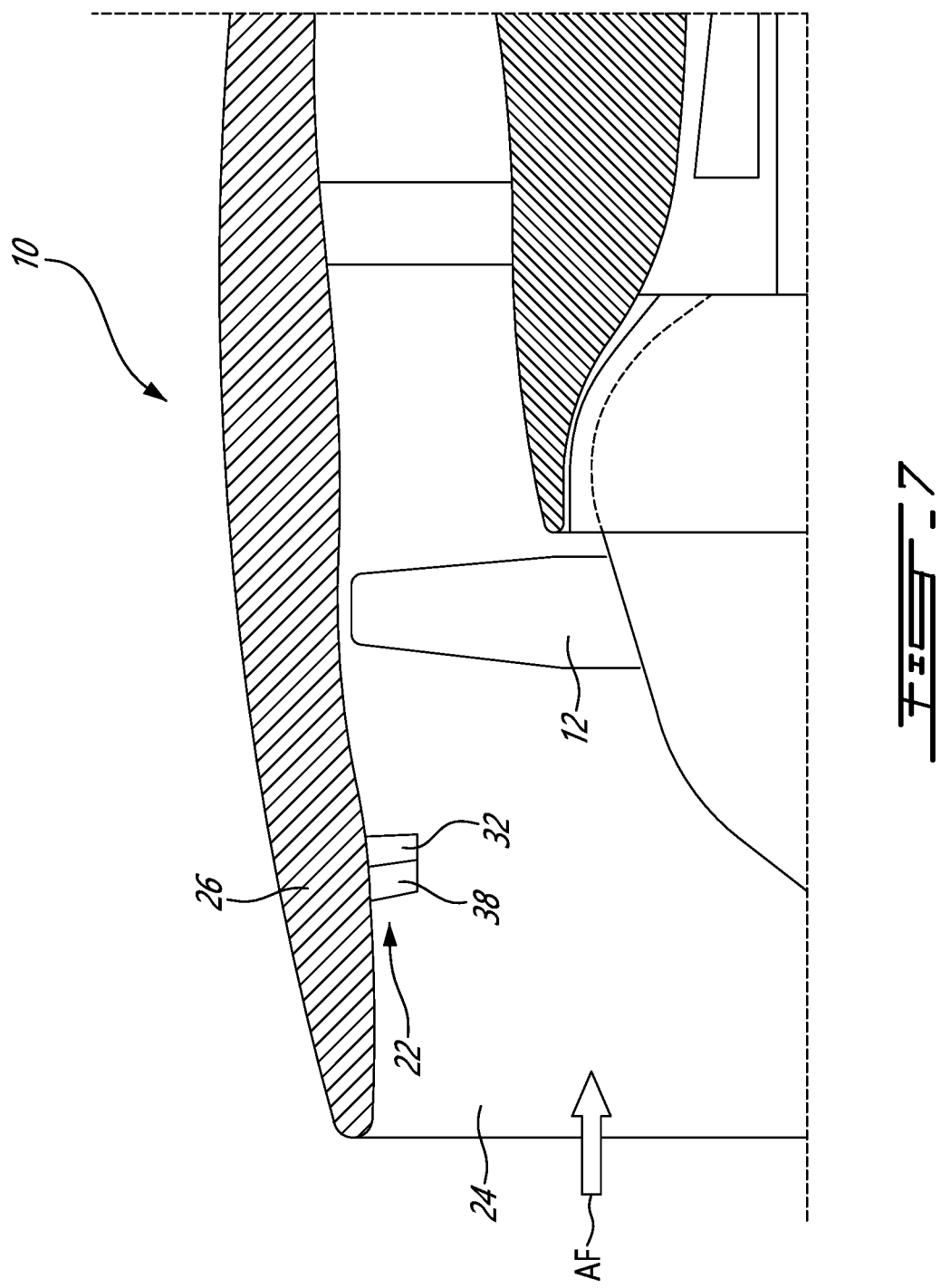

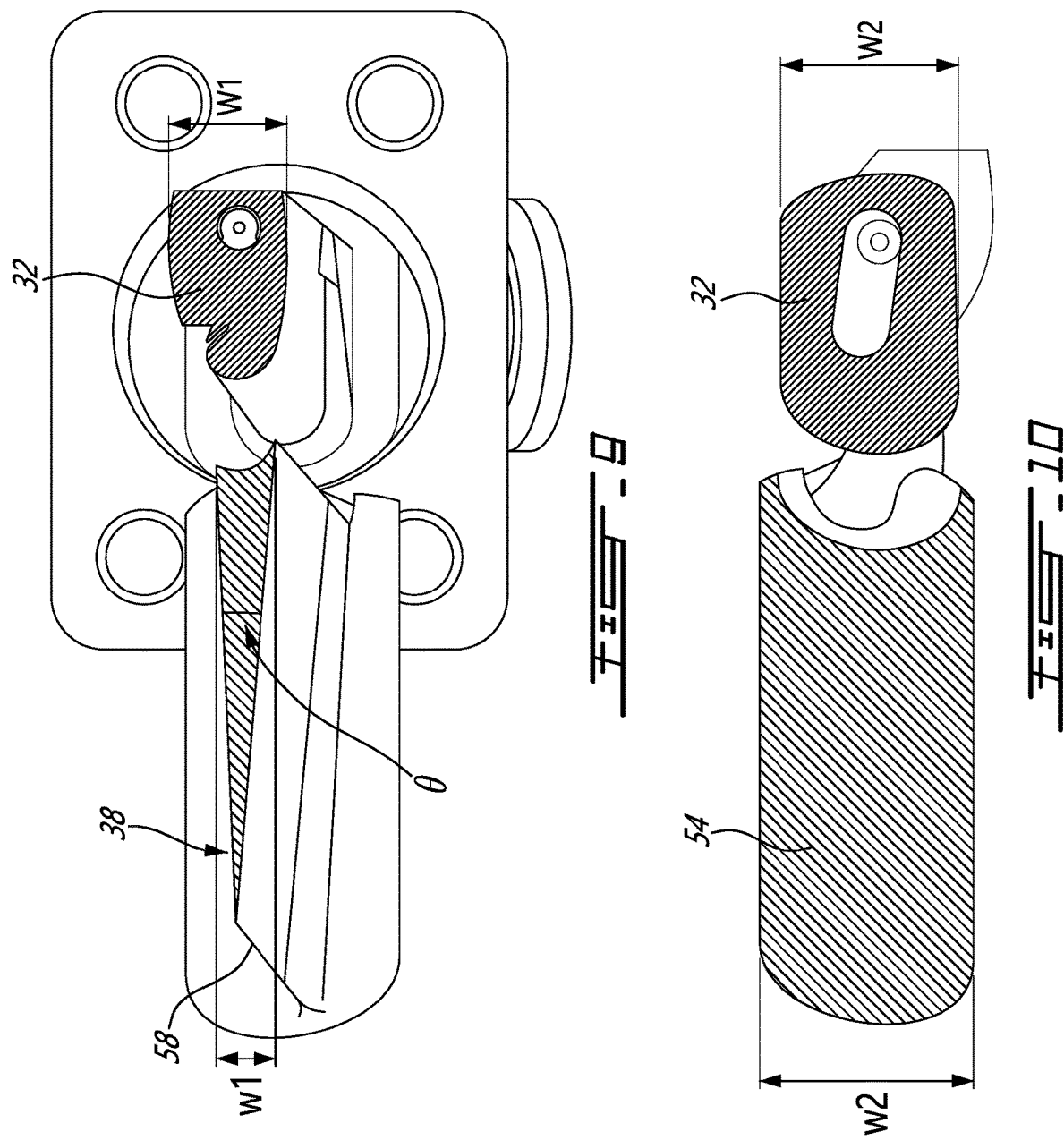

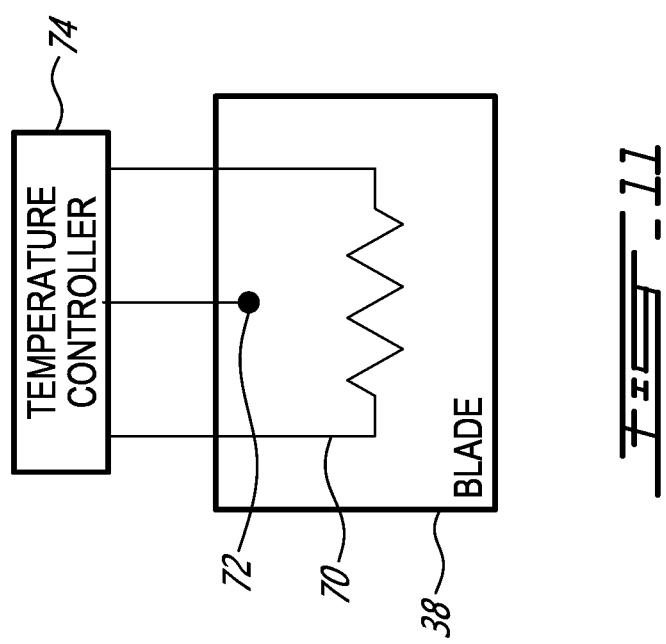

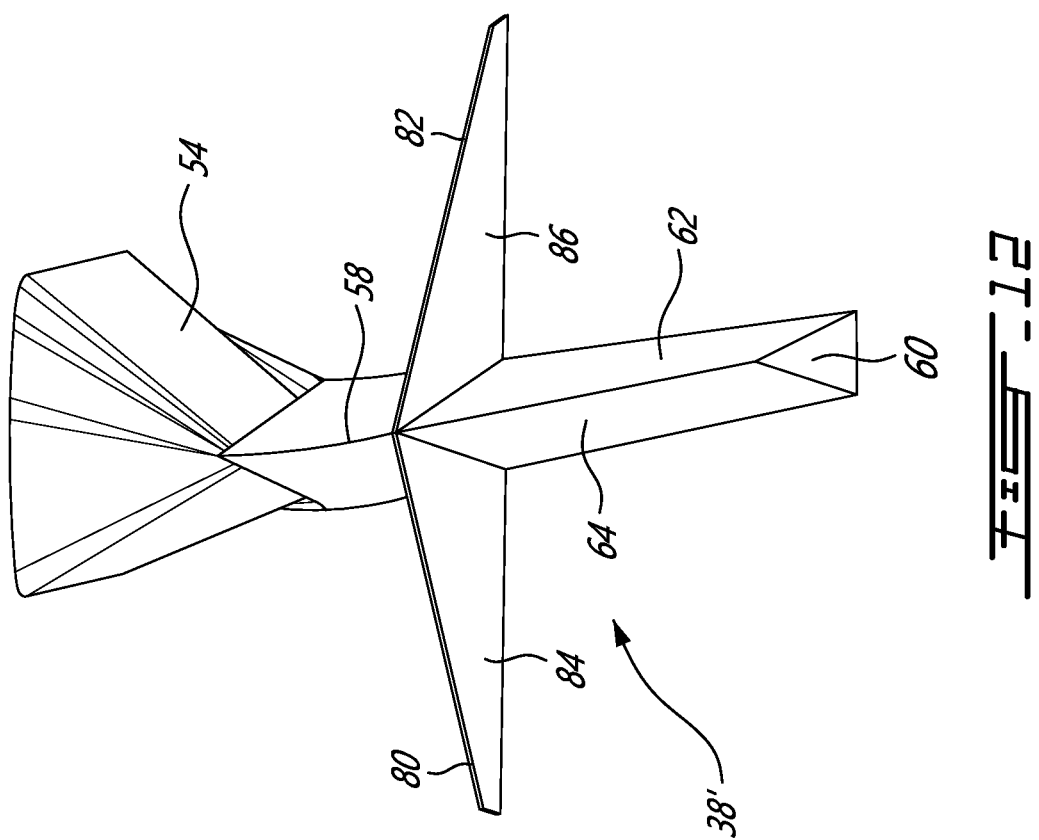

ICE ACCUMULATION AND SHEDDING MITIGATION FOR SENSOR PROBE

TECHNICAL FIELD

The disclosure relates generally to sensor probes and more particularly to mitigating ice accumulation and shedding associated with sensor probes for aircraft applications.

BACKGROUND OF THE ART

An aircraft turbofan engine typically has a temperature sensor incorporated in a probe which measures total temperature ($TT_0$) at an inlet of the engine. The total temperature is the temperature of a free stream of air entering the inlet of the engine. The total temperature measurement may be provided to an engine controller and may be used to assist in controlling the engine during operation.

A $TT_0$ probe may be prone to icing during operation of an aircraft to which the turbofan engine is mounted. Chunks of ice shed from a $TT_0$ probes may be ingested by the engine, which may be undesirable. Improvement is therefore desirable.

SUMMARY

In one aspect, the disclosure describes a sensor probe for installation in a stream of air entering an aircraft engine. The sensor probe comprises:

a sensor for installation in the stream of air, the sensor having a front side for facing toward the stream of air; and a wedge-shaped blade disposed in front of the sensor, the wedge-shaped blade having two faces meeting at a leading edge oriented to face the stream of air.

In another aspect, the disclosure describes an ice accumulation and shedding mitigation device for a sensor installed in a stream of air entering an aircraft engine. The device comprises:

a base attachable to a casing conveying the stream of air; and a wedge-shaped blade attached to the base, the wedge-shaped blade having two faces meeting at a leading edge oriented to face the stream of air.

In another aspect, the disclosure describes a turbofan engine comprising:

a fan through which a stream of air entering the turbofan engine is propelled;

a compressor for pressurizing the air;

a combustor in which the compressed air is mixed with fuel and ignited for generating a stream of combustion gas;

a turbine for extracting energy from the combustion gas; and a sensor probe installed in the stream of air, the sensor probe comprising:

a sensor having a front side for facing toward the stream of air; and a wedge-shaped blade disposed in front of the sensor, the wedge-shaped blade having two faces meeting at a leading edge of the wedge-shaped blade.

Further details of these and other aspects of the subject matter of this application will be apparent from the detailed description and drawings included below.

DESCRIPTION OF THE DRAWINGS

Reference is now made to the accompanying drawings, in which:

FIG. 1 shows an axial cross-section view of a turbofan gas turbine engine;

FIG. 2 shows a schematic representation of an exemplary sensor probe of the engine of FIG. 1;

FIG. 3 shows a perspective view of an exemplary housing of a sensor probe;

FIG. 4 shows a top front perspective view of an exemplary ice accumulation and shedding mitigation device;

FIG. 5 shows a bottom rear perspective view of the ice accumulation and shedding mitigation device of FIG. 4;

FIG. 7 shows a partial axial cross-section view of a turbofan gas turbine engine with a sensor probe including an ice accumulation and shedding mitigation device;

FIG. 9 shows a cross-section view of the ice accumulation and shedding mitigation device and the housing of the sensor probe, taken along line B-B of FIG. 8;

FIG. 10 shows a cross-section view of the ice accumulation and shedding mitigation device and the housing of the sensor probe, taken along line A-A of FIG. 8;

FIG. 11 shows a schematic representation of an ice accumulation and shedding mitigation device with heating element(s); and FIG. 12 is a bottom front perspective view of an ice accumulation and shedding mitigation device.

DETAILED DESCRIPTION

Figure 6A:
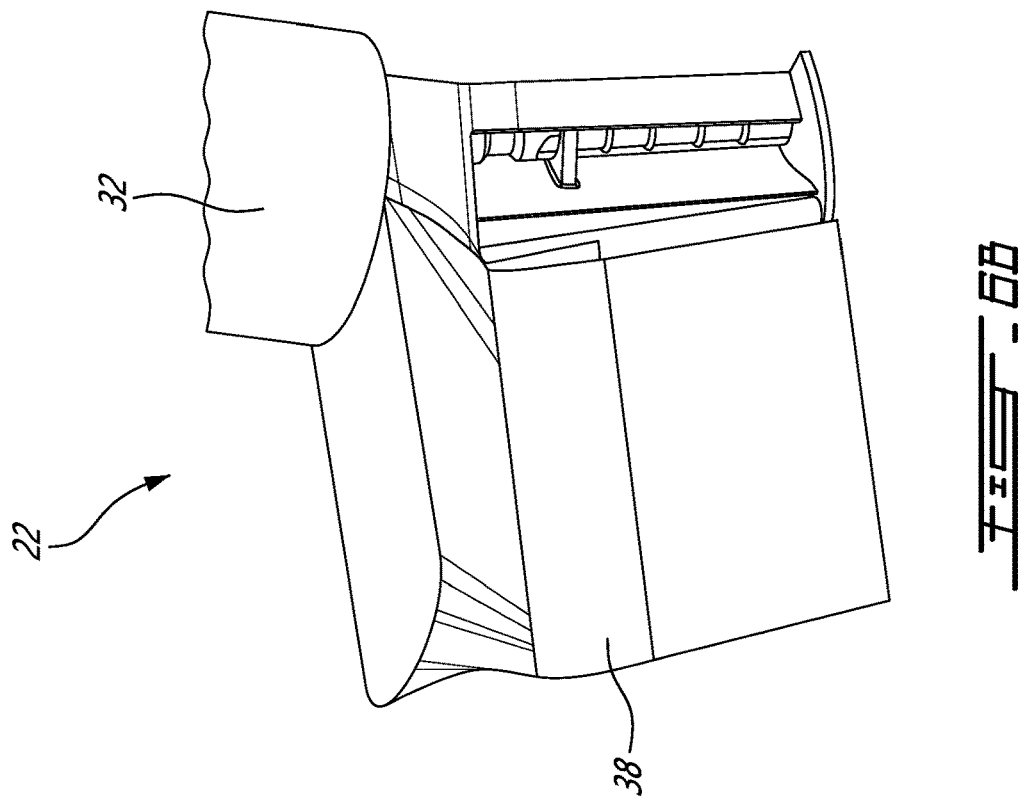
FIG. 6A and FIG. 6B are perspective views of an example installation sequence of the ice accumulation and shedding mitigation device of FIG. 4 with a housing of the sensor probe.

The present disclosure relates to ice accumulation and shedding mitigation devices associated with sensor probes (e.g., temperature and/or pressure probes) that extend into a stream of air (e.g., ambient air) entering an aircraft engine such as a turbofan gas turbine engine. The present disclosure also relates to sensor probes with integrated ice accumulation and shedding mitigation device(s).

In some embodiments, ice accumulation and shedding devices described herein may promote reduced ice accumulation on sensor probes and/or promote shedding of accumulated ice from sensor probes in smaller pieces as opposed to larger chunks.

The term "attached" and "coupled to" may include both direct attachment/coupling (in which two elements contact each other) and indirect attachment/coupling (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

FIG. 1 illustrates an exemplary gas turbine engine 10 of a type preferably provided for use in subsonic flight, generally comprising, in serial flow communication, a fan 12 through which ambient air (i.e., airflow referenced as "AF" in FIG. 1) is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Engine 10 may comprise a conventional or other type of gas turbine engine suitable for use in aircraft applications. For example, engine 10 may comprise a turbofan or a turboprop type of engine.

Engine 10 may comprise one or more control device(s) such as electronic engine controller(s) (referred hereinafter as "EEC 20") and related accessories that control at least some aspects of performance of engine 10. EEC 20 may regulate at least some aspect(s) of operation of engine 10 based on one or more input variables. EEC 20 may, for example, be configured to receive multiple input variables representative of current flight conditions including air density, total temperature of inlet air (TN, pressure of inlet air ($P_0$), throttle lever position, engine temperatures, engine pressures, and potentially other parameters. Accordingly, EEC 20 may receive one or more signals from one or more sensors associated with various aspects of the operation of engine 10 such as, for example, sensor probe 22 (referred hereinafter as "probe 22"). Such signals may be received as input by EEC 20 and analyzed using one or more data processors according to stored machine-readable instructions. Engine parameters such as fuel flow, stator vane position, bleed valve position, and others may be computed from this data and applied as appropriate by, for example, generating suitably-configured output signals and providing them to relevant device(s) associated with the engine 10.

Probe 22 is configured to extend in a stream of air entering engine 10, i.e., airflow AF. Probe 22 may be disposed upstream of fan 12 in relation to airflow AF. Probe 22 may be configured to provide signals representative of one or more measured properties such as, for example, temperatures and/or pressure associated with airflow AF. Probe 22 may be configured to provide a signal representative of a total temperature ($TT_0$) of a free stream of air entering an inlet of engine 10. In various embodiments, probe 22 may comprise one or more temperature sensors and/or one or more pressure sensors. For example, in some embodiments, probe 22 may be of the type commonly known as a "$T_0/P_0$" probe. Probe 22 may be disposed near or within inlet 24 of engine 10 and may extend radially inwardly (i.e., be cantilevered) from a wall of casing 26 conveying airflow AF for example. Alternatively, probe 22 may be of a type suitable for mounting on an aircraft at a location other than in engine 10 such as on the outside of an aircraft fuselage for example.

FIG. 2 shows a schematic representation of an example probe 22. Probe 22 may comprise one or more probe sensors 30 (referred hereinafter in the singular) and housing 32 housing sensor 30. Sensor 30 may comprise a temperature sensor and/or a pressure sensor as explained above. Housing 32 may be configured to extend into and be exposed to airflow AF. Housing 32 may comprise one or more inlets 33 and one or more outlets 35 to permit the passage of air through housing 32 so that sensor 30 may be exposed to some of the air from airflow AF entering inlet 33 and exiting outlet 35. In some embodiments, blade 38 may be configured to avoid undesirably affecting the flow of air through inlet 33 and outlet 35.

Probe 22 may additionally comprises an ice accumulation and shedding device such as blade 38 as an example. Sensor 30 may have front side 30A for facing toward the stream of air referenced as airflow AF. Blade 38 may be disposed in front of sensor 30 and shield at least part of housing 32 and sensor 30 from airflow AF. For example, blade 38 may be a separate component from housing 32 and may be disposed upstream of housing 32 and exposed to airflow AF. Alternatively, blade 38 may be part of housing 32. For example, housing 32 may be shaped to incorporate blade 38. In other words, blade 38 may be integrally formed with housing 32 so that blade 38 and housing 32 may have a unitary construction. In other words, housing 32 may include blade 38 in some embodiments.

FIG. 3 shows a perspective view of an example housing 32 housing a sensor 30 (shown schematically) and a base 34 for mounting to casing 26 or to another surface. Housing 32 may comprises front surface 36 that faces toward airflow AF (FIG. 1) during operation. As depicted, front surface 36 has a bow shape that is relatively blunt (i.e., non-sharp), which depending on the environment conditions, may be prone to accumulation of ice thereon without the use of blade 38.

It should be understood that housing 32 may have different shapes including different shapes and configurations of front surface 36. Embodiments of blade 38 are intended to be compatible with probe housings 32 of other shapes and configurations.

FIGS. 4 and 5 show, respectively, a top front perspective view and a bottom rear perspective view of an example blade 38 of probe 22. Blade 38 may be disposed in engine 10 in front of housing 32 to be upstream of housing 32, and be exposed to an airflow AF (FIG. 1). When disposed upstream of housing 32, ice may accumulate preferentially on blade 38 instead of housing 32. In some embodiments, blade 38 may be configured to hinder the accumulation of large ice formations on probe 22 and also promote shedding of accumulated ice in smaller (e.g., and relatively harmless) pieces, as detailed herein compared to sensor probes that do not have blade 38. It should be understood that blade 38 may not absolutely prevent all ice accumulation on probe 22 and some ice may still accumulate in some conditions.

Blade 38 may comprise a mounting surface 52 for mounting on an aircraft or engine surface (e.g., of casing 26) to be adjacent and upstream of housing 32. Mounting surface 52 may be shaped (e.g., contoured) for flush mounting on such surface. Mounting surface 52 may be part of a different intermediate mounting structure (e.g., a flange not exposed to the air flow AF) whose purpose is to fix blade 38 to its carrying structure in case such carrying structure is offset from casing 26 or outer surface of the aircraft, as dictated by the particular application design. Blade 38 may be attached (e.g., fastened) the mounting location via surface 52 and optionally via another intermediate mounting structure attached to surface 52.

In some embodiments, blade 38 may be attached to or integrally formed with base 54 defining mounting surface 52. Base 54 may have one or more transition (e.g., filleted) surfaces for blending the different cross-sectional profiles of blade 38 and mounting surface 52. For example, the shape of base 54 may be tapering radially-inwardly in reference to the installation of FIG. 1 from mounting surface 52 toward blade 38.

In contrast to front surface 36 of housing 32 which is relatively blunt, blade 38 may be wedge-shaped and have a relatively sharp leading edge 58 for facing and interacting with airflow AF in front of and upstream of housing 32. Blade 38 may extends from base 54 to a bottom surface 60. Leading edge 58 may be oriented to be transverse the direction of airflow AF.

As best seen in FIG. 5, leading edge 58 may be provided at the convergence of faces 62 and 64 of blade 38. In other words, blade 38 may include faces 62 and 64 that meet at leading edge 58. Faces 62 and 64 may converge at leading edge 58 at an (e.g., acute) angle θ to define a relatively sharp leading edge 58. In some embodiments, faces 62 and 64 may be substantially planar. In some embodiments, at least a majority of the surface area of each face 62, 64 may be substantially planar. The sharpness of leading edge 58 may cause a corresponding stress concentration in an ice formation accumulated on blade 38 extending between faces 62 and 64 and around leading edge 58. Such stress concentration may promote the breaking (i.e., splitting) of the ice formation sooner and at the location of leading edge 58 and hence cause the ice formation to be shed as (e.g., two) smaller pieces as opposed to a single larger piece. For example, in some embodiments, angle θ may equal to or be less than 120°. For example, in some embodiments, angle θ may be between 5° and 90°. For example, in some embodiments, angle θ may be between 10° and 45°. In addition, faces 62 and 64 may be oriented so that angle θ is uniform or non-uniform (i.e., varies) along the span of leading edge 58.

Blade 38 may comprise a rear probe-facing surface 66 for engagement with probe 22 when blade 38 is mounted adjacent to probe 22. For example, probe-facing surface 66 may have a concave shape to conform to at least a portion of convex front surface 36 of housing 32 and fit snugly against front surface 36 of housing 32 when blade 38 is installed in front of housing 32 and of sensor 30.

Figure 6B:
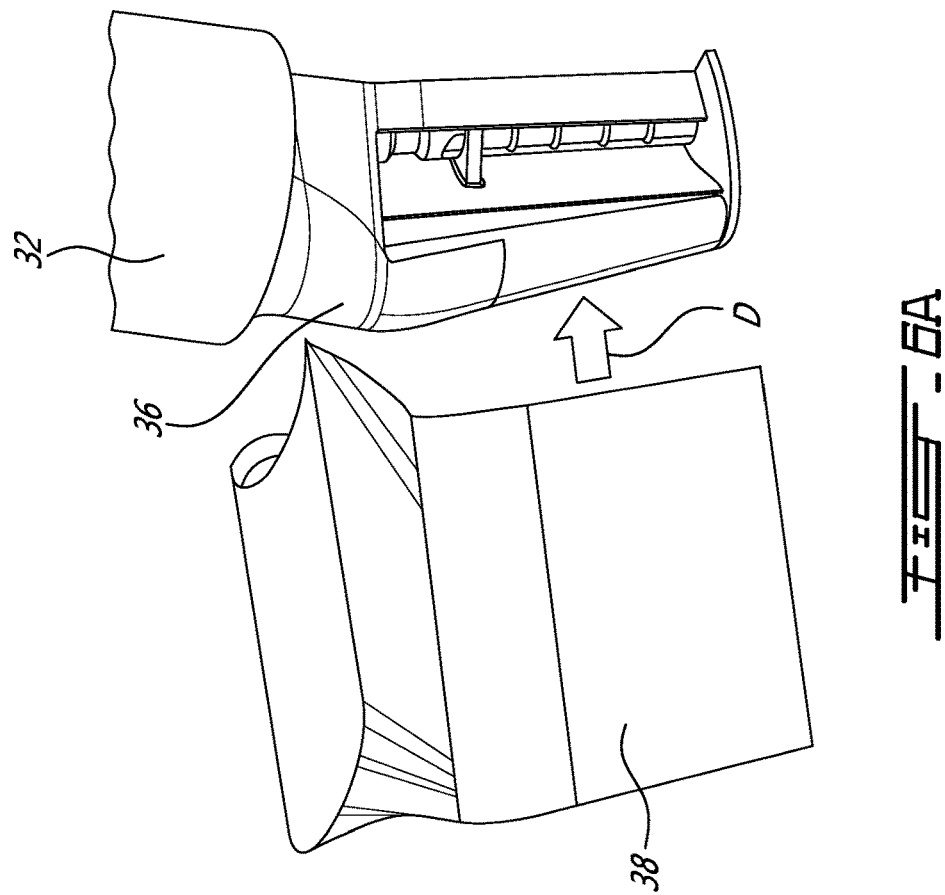

FIG. 6A and FIG. 6B show an example installation sequence, according to which blade 38 may be moved along a direction D from an initial position spaced from housing 32 (FIG. 6A) to a mated position with housing 32 (FIG. 6B). In such mated position, probe-facing surface 66 may fit snugly against front surface 36 of housing. Blade 38 may then be attached to a surface of casing 26 for example. In some embodiments, probe-facing surface 66 may be spaced apart from front surface 36 of housing 32 to define a gap therebetween.

Blade 38 may be mounted on various surfaces. For example, when probe 22 is disposed near or within inlet 24 of engine 10, blade 38 may be mounted near or within inlet 24 upstream of housing 32. For example, as shown in FIG. 7, blade 38 may be mounted to extend radially inwardly (e.g., be cantilevered) from casing 26 or other suitable wall/surface within inlet 24 of engine 10.

Alternatively, when probe 22 is disposed at another location such as outside of an aircraft fuselage, blade 38 may be mounted at such other location adjacent housing 32. Blade 38 may be attached (e.g., fastened) using bolts, screws, adhesive or other suitable means. For example, mounting surface 52 may include one or more threaded holes formed into base 54 to accommodate fasteners. Alternatively, surface 52 can be integrally formed with or otherwise attached to an intermediate mounting structure which is then attached (e.g., fastened) to the appropriate engine or aircraft interface using bolts, screws, adhesive or other suitable means. When mounted, blade 38 may occlude (shield) at least a portion of front surface 36 of housing 32 from airflow AF.

Figure 8:
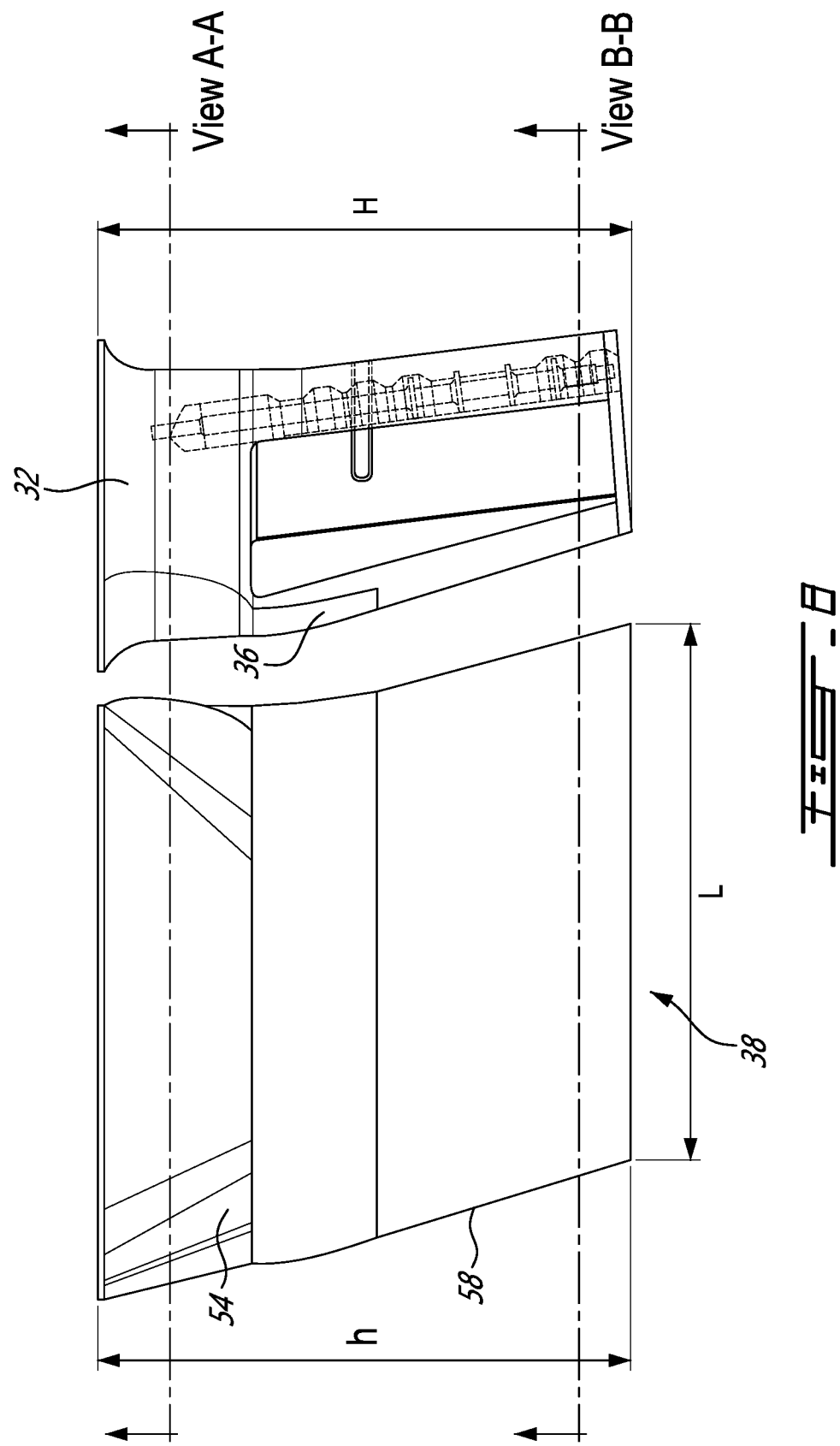
FIG. 8 shows a side elevation view of the ice accumulation and shedding mitigation device in association with the housing of the sensor probe.

FIG. 8 shows a side elevation view of blade 38 and housing 32 in a spaced apart relationship showing respective dimensions thereof relative to dimensions of housing 32. For a housing 32 having a height H, blade 38 may be sized to have a height h and a length L, where the values of height h and length L can both be selected based on the value of height H. For example, in some embodiments, the value of height h may be selected to be between approximately 0.8 to 1.2 times the value of height H. For example, in some embodiments, value of length L may be between approximately 0.2 to 2.5 times the value of H. However in some embodiments, length L may not necessarily be selected as a function of height H.

FIG. 9 shows a cross-section view of blade 38 and housing 32, taken along line B-B of FIG. 8. For a housing 32 having a width W1, blade 38 may be sized to have a width w1, where the value of w1 may be selected based on the value of W1. For example, in some embodiments, the value of w1 may be selected to be between 0.2 to 1.2 times the value of W1. As will be appreciated, the angle θ defining the wedge shape of blade 38 may be a function of w1 and L. Accordingly, the values of w1 and L may be selected to provide the desired angle θ.

FIG. 10 shows a cross-section view of blade 38 and housing 32, taken along line A-A of FIG. 8. For a housing 32 having a width W1, blade 38 may be sized to have a width w2, where the value of w2 can be selected based on the value of W2. For example, in some embodiments, the value of w2 may be selected to be between 0.6 to 1.5 times the value of W2.

Blade 38 may be made of a metallic material such as a suitable aluminum alloy or a titanium alloy. In some embodiments, blade 38 may be made of a suitable fiber-reinforced composite material. In some embodiments, blade 38 may be made of the same type of material as housing 32. Blade 38 may be made by machining and/or injection molding for example. Blade 38 may be made to have a substantially solid or hollow interior.

During operation, the presence of blade 38 into airflow AF in front of housing 32 may mitigate ice accumulation and shedding according to one or more of the following mechanisms: (i) steep surface angles at leading edge 58 of blade 38 provide relatively less support for ice accumulation compared to the front surface 36 of housing 32, which may promote more frequent ice shedding, (ii) blade 58 may split accumulated ice, for example, in two or more pieces, thereby reducing the relative size of ice pieces that are shed from housing 32, and/or (iii) blade 58 may enable the formation of a stress concentration that promotes ice breakup (e.g., splitting) and subsequent shedding. It will be understood that the relative contribution of each of these mechanisms to overall mitigation of ice accumulation and shedding may vary from embodiment to embodiment and/or vary depending on environment conditions. Further, it will be understood that, in some embodiments, other mechanism(s) may be at play and blade 38 may not necessarily enable each of the above mechanisms to be present.

The foregoing mechanisms may be referred to as a passive mechanisms such that no energy needs to be supplied to blade 38 to effect the desired mitigation. Rather, mitigation may be provided, for example, inherently by way of the shape, size and position of part(s) of blade 38.

In some embodiments, the above-described passive mechanisms for mitigating ice accumulation and shedding may be combined with an active mechanism for mitigation using supplied energy. An example of an active mechanism is the use of heating elements to inhibit ice accumulation.

FIG. 11 shows a schematic representation of a blade 38 that comprises one or more optional heating elements 70 (referred hereinafter in the singular) to heat at least a portion of blade 38 where ice accumulation is expected to occur. For example, at least a portion of blade 38 may be heated by heating element 70. Heating at least a portion of blade 38 may contribute to ice accumulation and shedding mitigation. Heating element 70 may include an electrically resistive circuit/pattern conformably printed using a direct write process onto blade 38 or otherwise integrated with blade 38 so as to heat a region of interest on blade 38. Heating element 70 may be disposed at a location spaced from housing 32 to prevent significant heating of the air around sensor 30 and prevent affecting measurements acquired by sensor 30.

Blade 38 may also include one or more temperature sensors (referred hereinafter in the singular). Temperature sensor 72 may be disposed on the surface of blade 38 or embedded within blade 38. In some embodiments, temperature sensor 72 may be manufactured using a direct write process. In some embodiments, temperature sensor 72 may comprise a thermocouple and/or a resistance temperature detector.

Heating element 70 may be controlled by a temperature controller 74, which supplies a desired amount of electrical energy (e.g., current) from a power source to control heat output from heating element 70. Temperature controller 74 may be of known or other type and may be suitable for aircraft applications. Signals from temperature sensor 72 (i.e., feedback) may be provided to temperature controller 74 for the purpose of controlling the operation of heating element 70 in a closed control loop manner for example. In some embodiments EEC 20 may be operatively coupled to temperature controller 74 or may incorporate the function of temperature controller 74.

FIG. 12 is a bottom front perspective view of an ice accumulation and shedding blade 38', in accordance with another embodiment. Blade 38' differs from blade 38 in that one or more optional wedge-shaped structures 84 and 86 and respective leading edges 80 and 82 may be provided in addition to leading edge 58. Leading edges 80 and 82 may be disposed to extend laterally from opposite respective faces 62, 64. Each of wedge shaped structures 84 and 86 may, similarly to blade 38, have two faces that converge to define leading edges 80, 82. Blade 38' may otherwise be substantially similar to blade 38 previously described above. When blade 38' is installed for use, leading edges 80 and 82 may also be oriented to face airflow AF.

Leading edges 80 and 82 may be configured and function as explained above in relation to leading edge 58 to promote ice shedding in small pieces. Blade edges 80 and 82 may each be oriented to be substantially transverse to leading edge 58. In various embodiments, leading edges 80 and/or 82 may be oriented at a various orientations relative to leading edge 58. In some embodiments, the number of leading edges may be further increased. Leading edges 80, 82 may promote additional splitting of ice formations in smaller pieces.

It is understood that many types, shapes and configurations of temperature/pressure probes exist and that various aspects of the present disclosure would be equally applicable to probes other than those specific examples illustrated herein.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. A sensor probe for installation in a stream of air entering an aircraft engine, the sensor probe comprising:
    a sensor disposed inside a probe housing for installation in the stream of air, the probe housing having a convex front surface for facing toward the stream of air; and
    a wedge-shaped blade separate from the probe housing and installed in front of the probe housing, the wedge-shaped blade having two faces meeting at a leading edge oriented to face the stream of air, the wedge-shaped blade including a concave rear surface fitting against the convex front surface of the probe housing.

2. The sensor probe of claim 1, wherein the two faces meet at the leading edge at an acute angle.

3. The sensor probe of claim 2, wherein the acute angle is between 10° and 45° degrees.

4. The sensor probe of claim 1, wherein:
    the wedge-shaped blade is attached to a base attachable to a casing conveying the stream of air;
    the wedge-shaped blade is a first wedge-shaped blade and the leading edge is a first leading edge;
    the sensor probe includes a second wedge-shaped blade having a second leading edge oriented to face the stream of air; and
    the second leading edge extends transversely to the first leading edge.

5. The sensor probe of claim 1, wherein the sensor is a temperature sensor.

6. An ice accumulation and shedding mitigation device in combination with a sensor installed in a stream of air entering an aircraft engine, the device comprising:
    a base directly attachable to a casing conveying the stream of air;
    a first wedge-shaped blade directly attached to the base, the first wedge-shaped blade having two faces meeting at a first leading edge oriented to face the stream of air, the first wedge-shaped blade being positioned entirely in front of a housing of the sensor; and
    a second wedge-shaped blade having a second leading edge oriented to face the stream of air, the second leading edge extending transversely to the first leading edge.

7. The device of claim 6, wherein the two faces meet at the first leading edge at an acute angle.

8. The device of claim 6, wherein the first wedge-shaped blade includes a concave surface for engagement with the housing of the sensor.

9. The device of claim 6, further comprising a heating element for heating the first wedge-shaped blade.

10. A turbofan engine comprising:
    a fan through which a stream of air entering the turbofan engine is propelled;
    a compressor for pressurizing the air;
    a combustor in which the pressurized air is mixed with fuel and ignited for generating a stream of combustion gas;
    a turbine for extracting energy from the combustion gas; and
    a sensor probe installed in the stream of air, the sensor probe comprising:
        a sensor disposed inside a probe housing having a convex front surface for facing toward the stream of air; and
        a wedge-shaped blade separate from the probe housing and installed in front of the probe housing, the wedge-shaped blade having two faces meeting at a leading edge of the wedge-shaped blade, the wedge-shaped blade including a concave rear surface fitting against the convex front surface of the probe housing.

11. The turbofan engine of claim 10, wherein the two faces meet at the leading edge at an acute angle.

12. The turbofan engine of claim 10, wherein:
- the sensor probe is disposed upstream of the fan relative to the stream of air;
- the sensor includes a temperature sensor; and
- the wedge-shaped blade is attached to a casing conveying the stream of air.

\* \* \* \* \*